(12) United States Patent
Duguid et al.

(10) Patent No.: US 7,921,714 B2
(45) Date of Patent: Apr. 12, 2011

(54) ANNULAR REGION EVALUATION IN SEQUESTRATION WELLS

(75) Inventors: Andrew John Duguid, Moon Township, PA (US); Edward C. Boratko, Sugar Land, TX (US); Ahmad Latifzai, Katy, TX (US)

(73) Assignee: Schlumberger Technology Corporation, Cambridge, MA (US)

( * ) Notice: Subject to any disclaimer, the term of this patent is extended or adjusted under 35 U.S.C. 154(b) by 525 days.

(21) Appl. No.: 12/114,473

(22) Filed: May 2, 2008

(65) Prior Publication Data

US 2009/0272530 A1 Nov. 5, 2009

(51) Int. Cl.
*E21B 47/10* (2006.01)
*E21B 33/10* (2006.01)

(52) U.S. Cl. .............. 73/152.57; 73/152.39; 166/250.17

(58) Field of Classification Search ............... 73/152.39, 73/152.54, 152.55, 152.57; 166/55.2, 250.14, 166/250.17, 306
See application file for complete search history.

(56) References Cited

U.S. PATENT DOCUMENTS

| | | | |
|---|---|---|---|
| 4,860,581 A | 8/1989 | Zimmerman et al. | |
| 4,936,139 A | 6/1990 | Zimmerman et al. | |
| 5,269,180 A | 12/1993 | Dave | |
| 5,348,420 A * | 9/1994 | Bernhardt | 405/52 |
| 5,925,879 A | 7/1999 | Hay | |
| 6,305,470 B1 * | 10/2001 | Woie | 166/250.02 |
| 6,328,103 B1 * | 12/2001 | Pahmiyer et al. | 166/250.17 |
| 6,575,242 B2 * | 6/2003 | Woie | 166/250.02 |
| 6,622,554 B2 * | 9/2003 | Manke et al. | 73/152.55 |
| 2004/0040707 A1 * | 3/2004 | Dusterhoft et al. | 166/279 |
| 2005/0279499 A1 | 12/2005 | Tarvin | |
| 2006/0175056 A1 | 8/2006 | Vercaemer | |

OTHER PUBLICATIONS

Gasda, S.E. et al., Determining effective wellbore permeability from a field pressure test: a numerical analysis of detection limits, Environmental Geology, DOI 10.1007/s00254-007-0903-7, Springer-Verlag, 2007, pp. 1-9.

* cited by examiner

*Primary Examiner* — John Fitzgerald
(74) *Attorney, Agent, or Firm* — Martin Rzaniak; David Cate; Robin Nava

(57) ABSTRACT

Methods and related systems are described for making measurements at multiple locations in an annular region of a cased sequestration well. A first tool module is positionable within the well and adapted to directly or indirectly measure changing pressure at a first location in the annular region of the well. A pressure change is induced at the first location in the annular region. A second tool module is positionable within the well and adapted to directly or indirectly measure changing pressure at a second location in the annular region. The measured pressure changes at the second location are in response to the induced pressure change at the first location.

38 Claims, 6 Drawing Sheets

ANNULAR REGION EVALUATION IN SEQUESTRATION WELLS

BACKGROUND OF THE INVENTION

1. Field of the Invention

This patent specification relates to testing in sequestration wells. More particularly, this patent specification relates to systems and methods for vertical isolation testing of the annular region between the casing and formation in sequestration wells.

2. Background of the Invention

Sequestration otherwise known as geo-sequestration or geological storage, involves injecting a material, such as carbon dioxide, directly into underground geological formations. Declining oil fields, saline aquifers, and unminable coal seams are included in potential storage sites. $CO_2$ has been injected into declining oil fields for more than 30 years to increase oil recovery. This option is attractive because the storage costs are offset by the sale of additional oil that is recovered. Further benefits are the existing infrastructure and the geophysical and geological information about the oil field that is available from the oil exploration. Oil fields have a geological barrier preventing upward migration of oil. It is believed that many such geological barriers are also sufficient as a long-term barrier to contain the injected $CO_2$.

A significant challenge with $CO_2$ sequestration is the prevention of leakage. To prevent leakage at the injection wells or other wells where potential leakage can occur such as current or disused production wells and/or monitoring wells, isolating cement is provided in the annular region between the well casing and the subterranean formations. Monitoring the isolating cement in the annular region helps to ensure that quality isolation is maintained over time. Techniques are known for evaluating isolating cement in conventional oil wells, such as cement bond logging, which measures the bond between the casing and cement, makes measurements using acoustic, sonic, and ultrasonic tools. However, there is a fundamental time-scale difference between the productive lifespan of a conventional oil well which can be a number or perhaps dozens of years, and the lifespan of a sequestration well which can be longer, possibly hundreds of years. Due to this difference in time scales, the cement evaluation techniques known for conventional oil wells may not be sufficient for monitoring cement quality over time for sequestration wells. Additionally, when $CO_2$ is placed in subterranean formations it tends to dissolve or disassociate to form carbonic acid. The carbonic acid is potentially detrimental to the isolating cement in the annular region. Therefore, additional methods and tools for evaluating the isolation quality of the annular region in cased sequestration wells are needed.

SUMMARY OF THE INVENTION

According to embodiments, a system for making measurements at multiple locations in an annular region of a cased sequestration well is provided. A first tool module is positionable within the well and adapted to directly or indirectly measure changing pressure at a first location in the annular region of the well. The annular region is defined by an outer surface of the well casing and one or more subterranean formations within which the well is positioned. A pressure altering system is arranged and positionable to induce a pressure change at the first location in the annular region. A second tool module is positionable within the well and adapted to directly or indirectly measure changing pressure at a second location in the annular region. The pressure changes at the second location are at least partly in response to the induced pressure change at the first location.

According to further embodiments a method for making measurements at multiple locations in an annular region of a cased sequestration well is provided. The method includes measuring directly or indirectly pressure at a first location within the annular region of the well. A pressure change is induced at the first location in the annular region. Pressure at a second location in the annular region is measured directly or indirectly. The pressure changes at the second location are at least partly in response to the induced pressure change at the first location.

As used herein the terms "sequestration well" and "sequestration wells" refers broadly to any wellbore or borehole used in connection with a sequestration or geological storage operation. This includes injection wells, other wells such as wells used for monitoring parameters related to the sequestration, wells used for injection or removal or formation fluids in relation to sequestration, and other wells that could potentially allow leakage of the sequestered matter such as current or disused production wells.

Further features and advantages of the invention will become more readily apparent from the following detailed description when taken in conjunction with the accompanying drawings.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PREFERRED EMBODIMENTS

In the following detailed description of the preferred embodiments, reference is made to accompanying drawings, which form a part hereof, and within which are shown by way of illustration specific embodiments by which the invention may be practiced. It is to be understood that other embodiments may be utilized and structural changes may be made without departing from the scope of the invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice. Further, like reference numbers and designations in the various drawings indicated like elements.

In wells used in connection with the sequestration of matter such as CO2, an important factor in preventing leaks is the quality of the isolating cement in the annular region between the well casing and the formation. An important step in evaluating the quality of the isolating cement is a measurement of the permeability of the annular region. Additionally, it is particularly useful to measure the average permeability of the annular region, since flow paths due to contaminants and/or other defects in the cement will tend to dominate the permeability measurement.

Figure 1A:
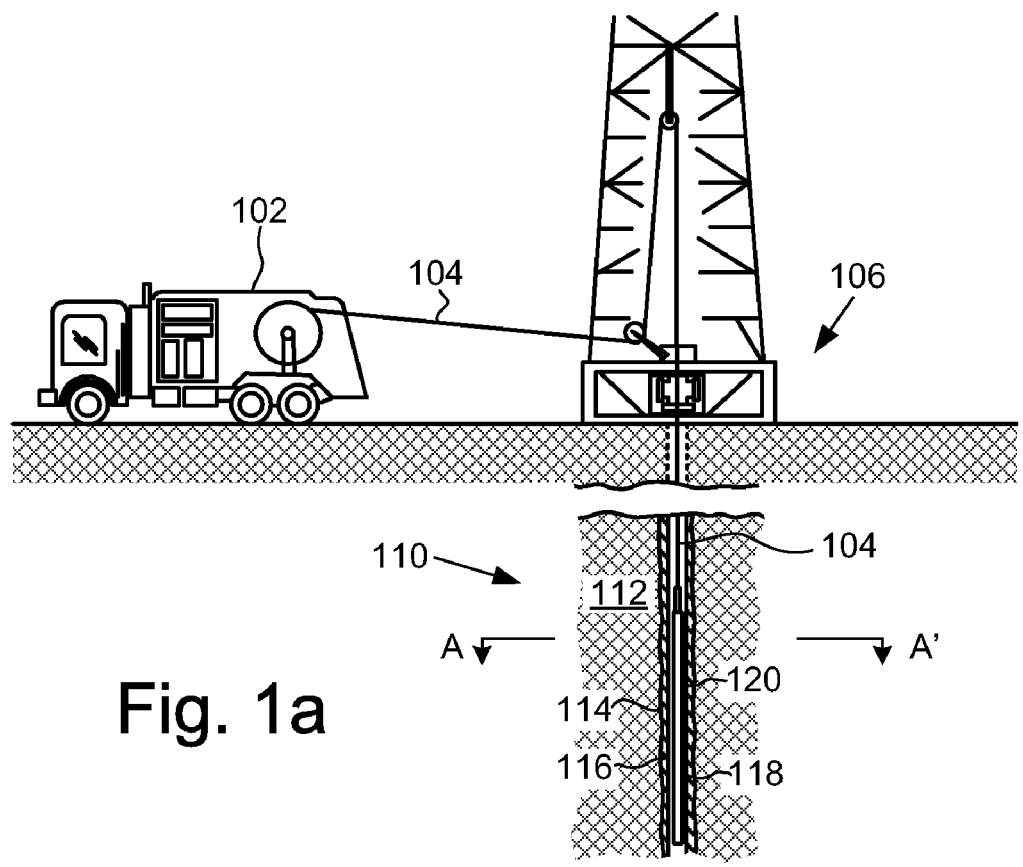
FIGS. 1a and 1b show a measurement system for facilitating the evaluation of an annular region of a sequestration well, according to embodiments.
Figure 1B:
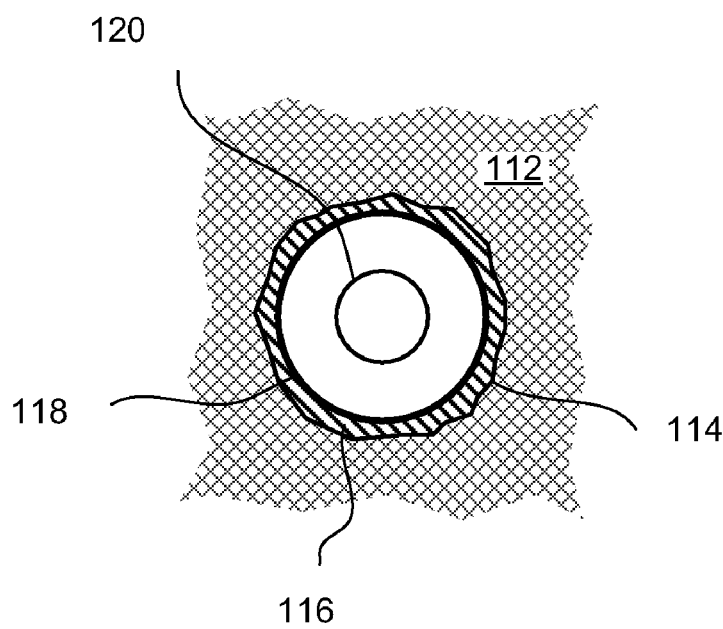

FIGS. 1a and 1b show a measurement system for facilitating the evaluation of an annular region of a sequestration well, according to embodiments. In FIG. 1a, wireline truck 102 is used to deploy wireline tool 120 in sequestration well 110 via wellhead 106. Tool 120 is suspended from wireline 104 which provides control and communication of data between tool 120 and truck 102. Sequestration well 110 includes casing 118 and is positioned within subterranean formation 112. An annular region 116 is defined by the outside surface of casing 118 and surface 114 of formation 112. Annular region 116 is filled primarily with an isolating cement, but also may include defects such as impurities, cracks and other pathways that may have a significant impact on the average permeability the annular region. FIG. 1b is a cross-section view across line A-A' of FIG. 1a. Tool 120 is shown within casing 118. The annular region 116 is shown defined by the outside surface of casing 118 and surface 114 of formation 112. Although tool 120 is shown deployed on a wireline in FIG. 1a, the tool could also be deployed using other known technologies such as coiled tubing or drill pipe.

According to embodiments, various tool configurations can be used in tool 120 to establish flow and/or measure pressure differences between two or more sets of perforations in cased wells. The data collected from the measurements of tool 120 are used to establish if the cement in annular region 116 and interfaces between the cement and casing 118 and cement and formation 112 are sufficiently capable of isolation for use in connection with sequestration activity. For example, in the sequestration of CO2, the cement will be exposed to CO2 and/or carbonic acid. The data from tool 120 can also be used to calculate the bulk mobility or permeability of the material and pathways between the casing and the formation.

By perforating or otherwise creating a hydraulic connection to the annular region 116 behind the casing 118 and using tools such as described herein, one can measure the response to pressure changes between zones of the well. As described in further detail herein, one or more sections of the well are separated from the rest of the well by sealing against the casing wall so that responses to pressure changes between different zones can be measured.

Figure 2:
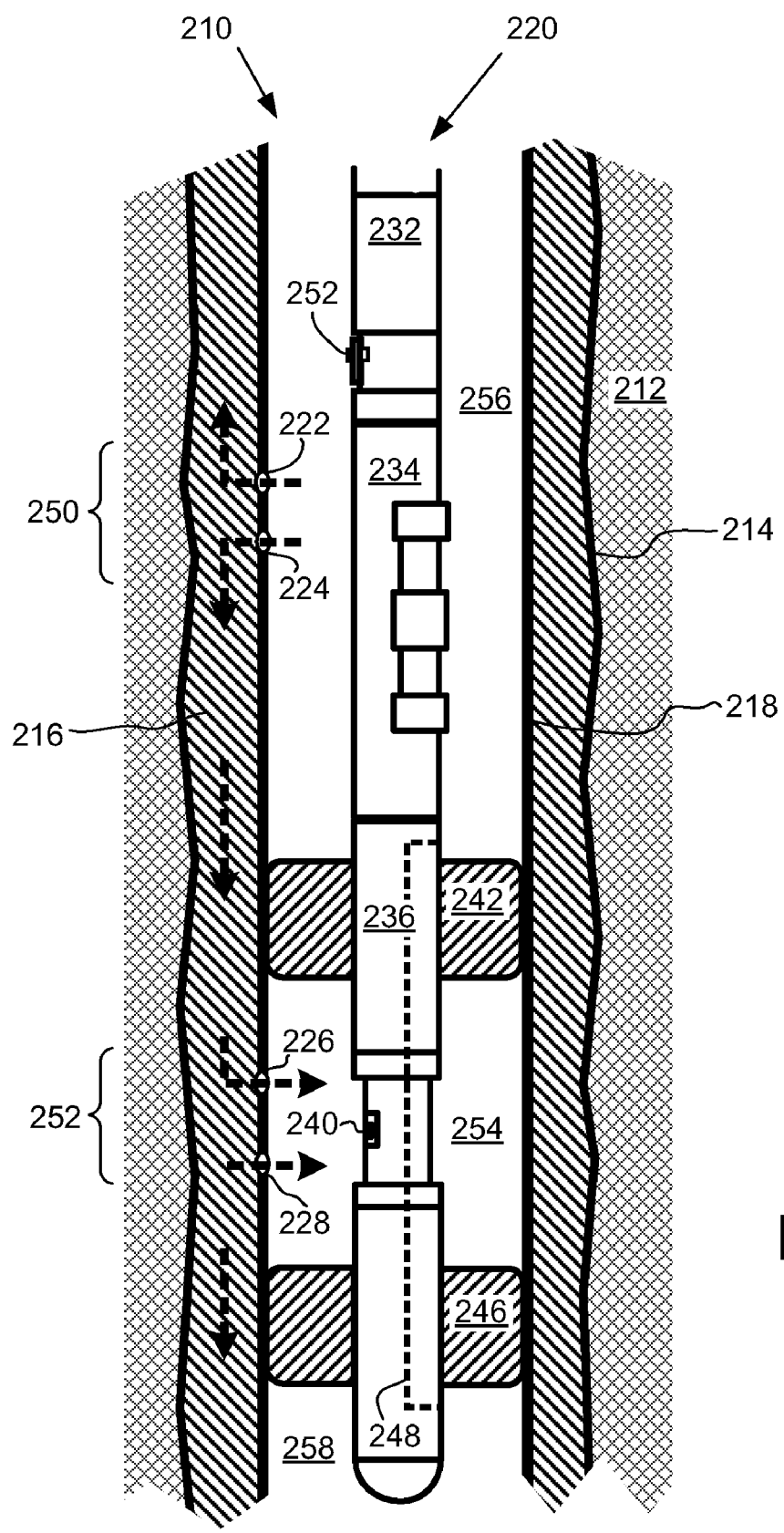
FIG. 2 shows further details of a tool configuration for making measurements to facilitate evaluation of the annular region between the casing and formation, according to embodiments.

FIG. 2 shows further details of a tool configuration for making measurements to facilitate evaluation of the annular region between the casing and formation, according to embodiments. Tool 220 is shown deployed within a sequestration well 210 having casing 218 positioned in subterranean formation 212. An annular region 216 is defined by the outer surface of casing 218 and formation surface 214. As described above, annular region 216 is filled primarily with an isolating cement, but also may include defects such as impurities, cracks and other pathways that may have a significant impact on the average permeability the annular region. Prior to deployment of tool 220, two set of perforations were formed in casing 218. One set includes perforations 222 and 224, and another set includes perforations 226 and 228. Note that in selecting a location for the perforations, a location should be selected such that the formation permeability is less than the bulk permeability of the annular region between the casing and formation.

Tool 220 includes a pressure measurement module 232, a pumping module 234 and a dual packer module 236. According to embodiments, pressure measurement module 232 is a wireline based downhole sampling tool such as the Modular Formation Dynamics Tester (MDT) tool from Schlumberger Limited. In particular, according to embodiments, the following MDT modules can be used: the single-probe module for measurement module 232; the pump-out module for pumping module 234; and the dual-packer module for module 236. The tool is positioned as shown in FIG. 2 with the upper inflatable packer 242 located above perforations 226 and 228, and lower inflatable packer 246 below those perforations. Thus, after inflation and proper setting of the packers, pressure sensor 240 is able to measure the pressure in the packed off region 254. The pressure in the packed off region 254 is approximately equal to but could be higher or lower than, the pressure in a zone 252 of annular region 216 in the vicinity of perforations 226 and 228.

According to embodiments, after the packers on module 236 are set, the pressure in well 210 is externally increased by pumping at the wellhead (not shown). The increase in pressure in region 256 will cause fluid to flow, and an associated pressure gradient, in directions as shown by the dashed arrows in FIG. 2. The pressure changes in region 256 of well 210 are measured by pressure sensor 252 in module 232. The pressure measured in region 256 will be approximately equal to the pressure in zone 250 of annular region 216 which is in the vicinity of perforations 222 and 224. Thus using modules 232 and 236, both the increased pressure at annular zone 250 and the response from the pressure increase at annular zone 252 can be measured. Note that in the case of external pressurization of the entire well, it is preferable that any other zones with perforations, such as the production zone of an hydrocarbon well, should be plugged. If such other perforations are not plugged, it is possible that the external pressure supplied to the well will be lost to the formation in the production zone instead of causing a pressure gradient between the annular zones 250 and 252 as intended.

According to alternate embodiments, a pressure differential can be created using pumping module 234. For example, pumping module 234 can pump fluid from the packed off region 254 via module 236 and into region 256 via module 232. Thus a pressure differential will be effected between annular zones 250 and 252. Note that such a pressure differential can also be reversed by pumping with module 234 in the opposite direction, causing flow and pressure drops in a direction opposite to shown by the dashed arrows in FIG. 2.

According to alternate embodiments, the packer inflation pressure can also be measured. The pressure measured in the packers can be used to estimate how much any pathways in the annular regions between the zones are being compressed.

The measured packer pressure can also be used to detect whether or not one or more an annular pathways exist.

Although not shown in FIG. 2, other modules are also included in tool 220. According to embodiments tool 220 also includes: a hydraulic power module containing an electric motor and hydraulic pump to provide hydraulic power; an electronic power module to convert AC power from the surface to provide DC power for all module of tool 220; a telemetry module for communication between the tool 220 and the surface; a scintillation gamma-ray tool module, and a logging equipment head. Examples of a fluid sampling systems having pressure measurement and pumping capabilities as well as packers are depicted and described in U.S. Pat. Nos. 4,936,139 and 4,860,581, which are incorporated by reference herein.

Thus the tool 220 works to measure pressure at two annular zones 250 and 252 behind the casing 218. The data from the measurements can be used to calculate the average permeability, average mobility, and/or isolation parameters of annular region 216. Note that although two perforations are shown near each annular zone 250 and 252, other numbers of perforations could be used including a single perforation for each annular zone.

According to embodiments a perforation gun is used to make the perforations 222, 224, 226 and 228. According to alternate embodiments, a tool such as the Cased Hole Dynamics Tester (CHDT) from Schlumberger Limited could be used for making the perforations in the casing using the CHDT's casing drilling technology. The CHDT tool could also be used to reseal the perforations following the measurement operation.

As mentioned, to improve the accuracy of the measurements, any other zones in the well that have hydraulic communication behind the casing should be isolated, or otherwise dealt with. In particular, if there are other places where there is communication it may be necessary to plug or remediate that portion of the well (for example, by plugging production perforations as described).

Note that it in the case that a probe-type module, such as a single probe module, is used for measurement module 232, the probe should not be extend to contact the casing because that would not give a representative pressure measurement for region 256 and the rest of the entire well. Note although the lower perforations 226 and 228 are shown straddled by the dual packer module 236, the upper perforations 222 and 224 could be straddled instead by the packers instead. This is because a pressure equalization line 248 in the dual packer module 236 will allow the pressure above the packers to equalize with the pressure in the region 258 below the packers.

Figure 3:
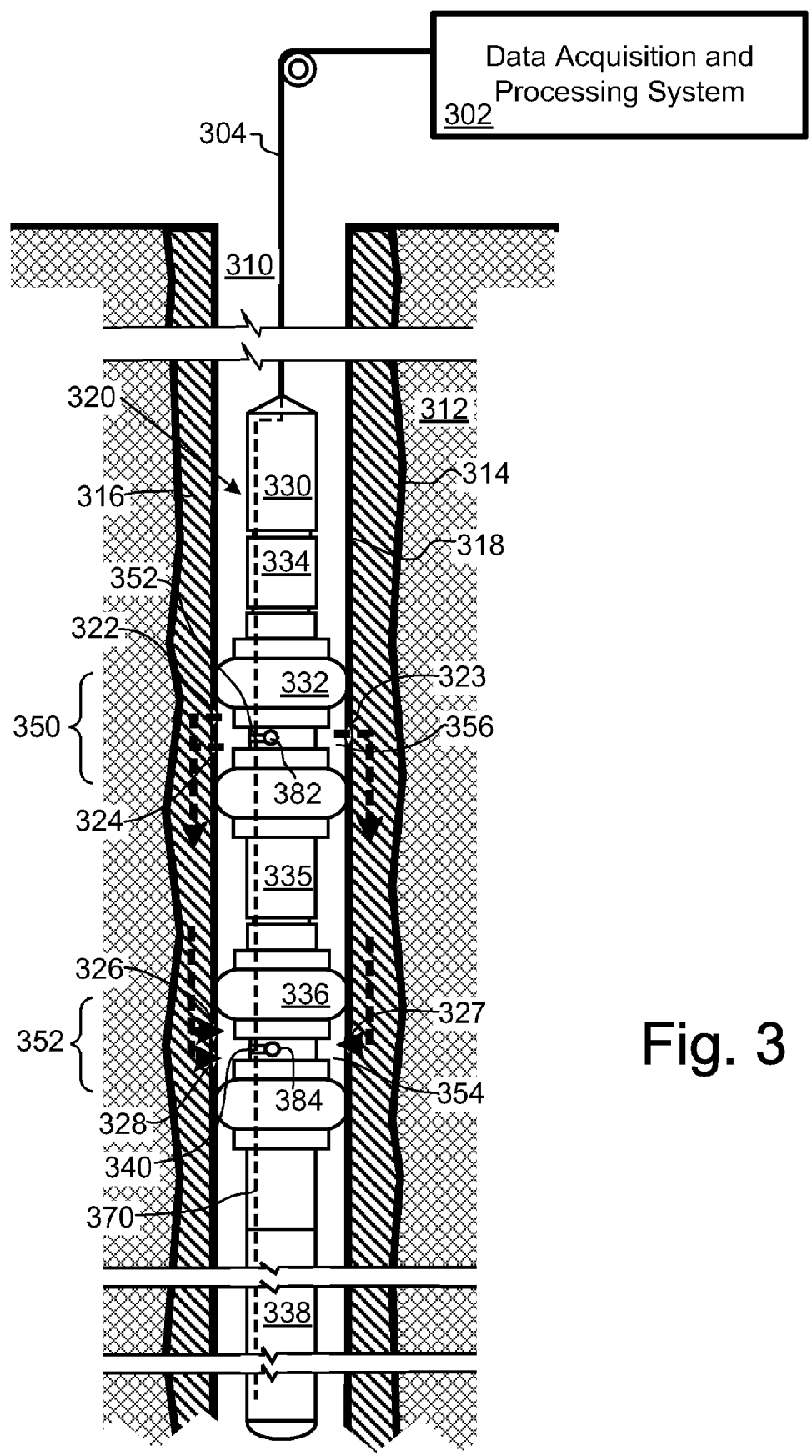
FIG. 3 shows further details of a tool configuration for making measurements to facilitate evaluation of the annular region between the casing and formation, according to further embodiments.

FIG. 3 shows further details of a tool configuration for making measurements to facilitate evaluation of the annular region between the casing and formation, according to further embodiments. Tool 320 is shown deployed within a sequestration well 310 having casing 318 positioned in subterranean formation 312. An annular region 316 is defined by the outer surface of casing 318 and formation surface 314. Prior to deployment of tool 320, two sets of perforations are formed in casing 318. One set includes perforations 322, 323 and 324, and another set includes perforations 326, 327 and 328.

Tool 320 includes: a telemetry module 330 for transmitting data and control signals between the surface based data acquisition and processing system 302 via wireline 304; electronic power module 334 which converts AC electrical power from wireline 304 to DC power for all the modules of tool 320; pump out module 335 having a bidirectional pump for moving fluid between modules, into and out of the formation via the perforations, and into and out of a flowline to inflate and deflate the packers; two dual packer modules 332 and 336; and electronics 338. According to embodiments, tool 320 uses modules of a wireline based downhole sampling tool such as the Modular Formation Dynamics Tester (MDT) tool from Schlumberger Limited.

The tool 320 is positioned as shown in FIG. 3 with the set of packers from the upper dual packer module 332 straddling the first set of perforations 322, 323 and 324; and the lower dual packer module 336 straddling the second set of perforations 326, 327 and 328. When the packers are inflated and properly set, the upper dual packer module 332 can pump fluid into and out of upper packed off region 356 via sampling port 352 and also measure pressure using the module's internal pressure sensor 382. Due to the upper set of perforations, the pressure measured by module 332 will reflect the pressure in zone 350 of annular region 316 that is in the vicinity of the upper set of perforations. Similarly, when the lower dual packer module 336 can pump fluid into and out of lower packed off region 354 via sampling port 340 and also measure pressure using the module's internal pressure sensor 384. Due to the lower set of perforations, the pressure measured by module 336 will reflect the pressure in zone 352 of annular region 316 that is in the vicinity of the lower set of perforations. According to embodiments, pressure in the form of injected fluid is supplied by the upper dual packer module 332. Fluid will be forced as shown by the dashed arrows outward from the upper set of perforations, into zone 350 and inward through the lower set of perforations from zone 352. The response to the pressure increase is measured in the other pressure sensor within lower dual packer module 336.

Like the tool arrangement shown in FIG. 2, the tool arrangement shown in FIG. 3 also measures pressure at two zones 350 and 352 behind the casing. The data from the measurements is passed via communication and control line 370 and wireline 304 to the surface where the data can be used to calculate parameters relating to permeability, mobility and/or isolation of annular region 316. Because each of the tested regions 354 and 356 are isolated from the rest of well 310 using dual packers, other perforations such as perforations in a production zone do not need to be plugged to make a measurement, so long as those perforations are not between the two testing zones 350 and 352.

Note that a location for the test should be selected where the casing 318 has good integrity and the permeability of the formation 312 is less then the bulk permeability of the annular region 316.

Figure 4:
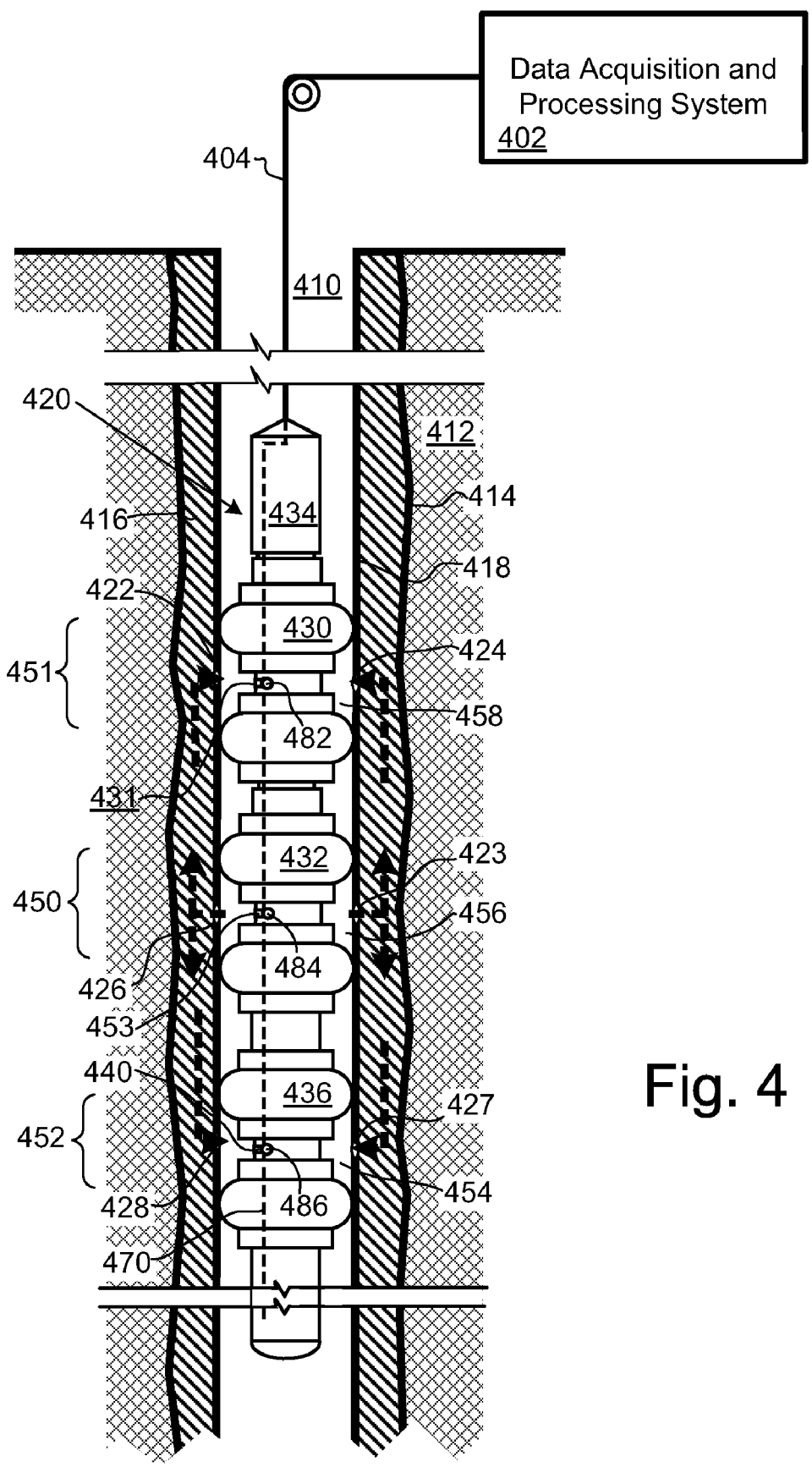
FIG. 4 shows further details of a tool configuration for making measurements to facilitate evaluation of the annular region between the casing and formation, according to further embodiments.

FIG. 4 shows further details of a tool configuration for making measurements to facilitate evaluation of the annular region between the casing and formation, according to further embodiments. Tool 420 is shown deployed within a sequestration well 410 having casing 418 positioned in subterranean formation 412. An annular region 416 is defined by the outer surface of casing 418 and formation surface 414. Prior to deployment of tool 420, three sets of perforations are formed in casing 418. One set includes perforations 422, and 424, a second set includes perforations 423 and 426, and a third set includes perforations 427 and 428.

Tool 420 includes: a telemetry module 434 for transmitting data and control signals between the surface based data acquisition and processing system 402 via wireline 404; electronic power module (not shown) which converts AC electrical power from wireline 404 to DC power for all the modules of tool 420; one or more pump out modules (not shown); and three dual packer modules 430, 432 and 436. According to embodiments, tool 420 uses modules of a wireline based downhole sampling tool such as the Modular Formation Dynamics Tester (MDT) tool from Schlumberger Limited.

The tool 420 is positioned as shown in FIG. 4 with the set of packers from the upper dual packer module 430 straddling the first set of perforations 422 and 424; dual packer module 432 straddling the second set of perforations 426 and 423, and the lower dual packer module 436 straddling the third set of perforations 427 and 428. When the packers are inflated and properly set, the middle dual packer module 432 can pump fluid into and out of packed off region 456 via sampling port 453 and also measure pressure using the module's internal pressure sensor 484. Due to the set of perforations 426 and 423, the pressure measured by module 432 will reflect the pressure in zone 450 of annular region 416 that is in the vicinity of those perforations. Similarly, the other two dual packer modules 430 and 436 can pump fluid into and out of packed off regions 458 and 454 respectively, via sampling ports 431 and 440 respectively, and also measure pressure using internal pressure sensors 482 and 486 respectively. Due to the respective sets of perforations, the pressure measured by module 430 will reflect the pressure in zone 451 of annular region 416, and the pressure measured by module 436 will reflect the pressure in zone 452 of annular region 416.

According to embodiments, pressure in the form of injected fluid is supplied by the upper dual packer module 432. Fluid will be forced as shown by the dashed arrows outward from the middle set of perforations, into zone 450 and inward through the upper and lower sets of perforations from zones 451 and 452. The response to the pressure increase induced by module 432 is measured in the pressure sensors of modules 430 and 436.

By establishing and testing a pressure gradient in both directions in response to the pressure change in zone 450, a better estimate of the permeability of the well can be obtained in some applications. The arrangement using three zones as shown in FIG. 4 can be particularly useful in cases where the permeability is believed to be different above and below the two zones.

The data from the measurements are passed via communication and control line 470 and wireline 404 to the surface where the data can be used to calculate parameters relating to permeability, mobility and/or isolation of annular region 416. Because each of the tested regions 454, 456 and 458 are isolated from the rest of well 410 using dual packers, other perforations such as perforations in a production zone do not need to be plugged to make a measurement, so long as those perforations are not between the two testing zones 450, 451 and 452.

Figure 5:
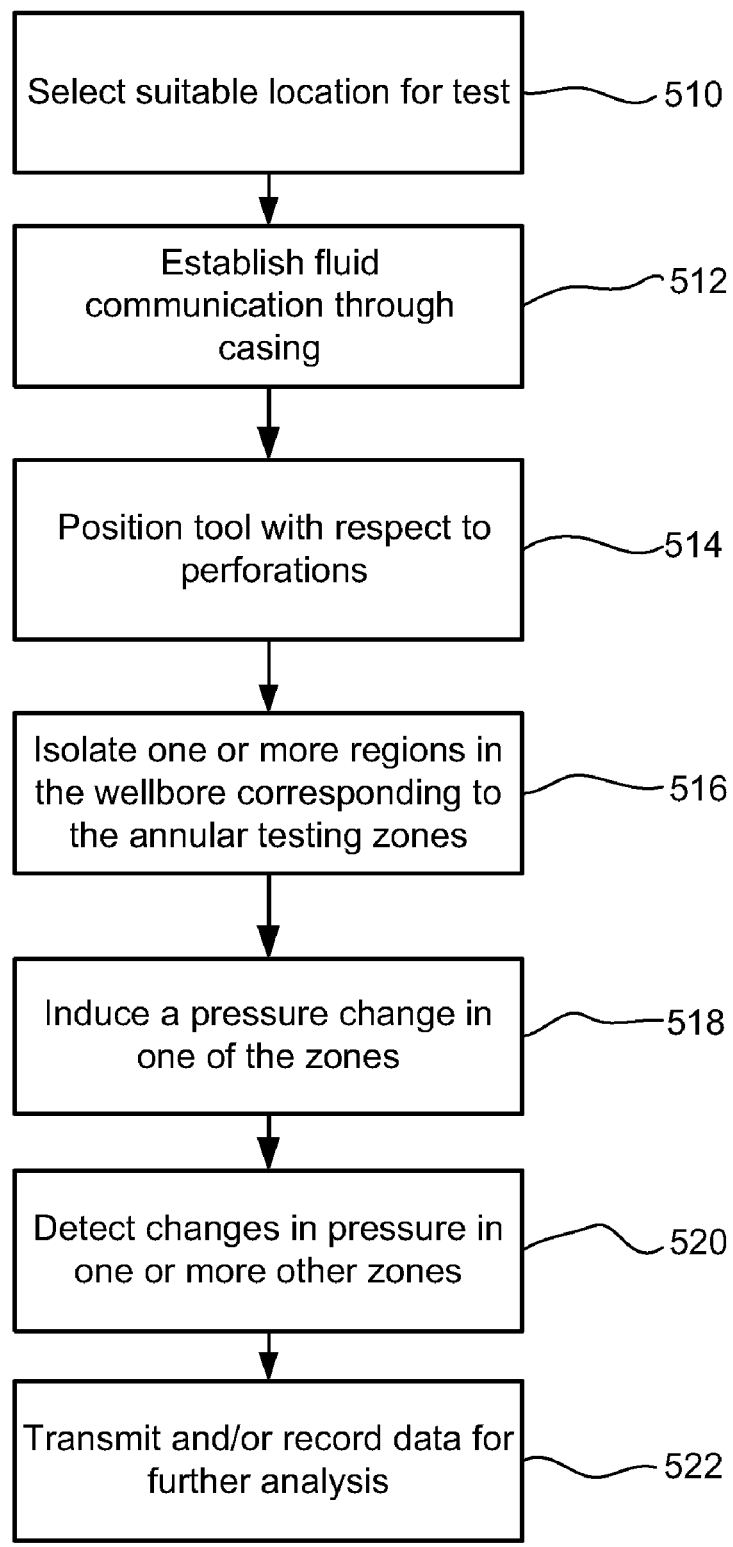
FIG. 5 is a flowchart showing steps involved in making measurements to facilitate evaluation of the annular region for sequestration wells, according to embodiments.

FIG. 5 is a flowchart showing steps involved in making measurements to facilitate evaluation of the annular region for sequestration wells, according to embodiments. In step 510, a suitable location for the annular region test is selected. As mentioned the location of the test should be selected where the casing has good integrity and the permeability of the surrounding formation is less then the bulk permeability of the annular region. In step 512, fluid communication is established through the casing. A perforation gun can be used to make the perforations through the casing. Alternatively, a tool such as the Cased Hole Dynamics Tester (CHDT) from Schlumberger Limited or another drilling or milling tool can be used for making the perforations in the casing using the CHDT's casing drilling technology. The CHDT tool could also be used to reseal the perforations following the measurement operation. In step 514, the measurement tool is positioned with respect to the perforations. In general, the tool should be positioned such that the pressure measurements can be obtained after one or more of the regions are isolated. In the case where one or more dual packer modules are used, the tool should be positioned such that the dual packers of each module straddles a set of perforations.

In step 516, one or more regions of the wellbore are isolated. Each isolated region should be in fluid communication with a corresponding annular zone involved in the test. Note that isolation may also involve plugging or isolating other regions that are not intended to be involved in the test. For example, production perforations may need to be plugged. In the case where packers are used for zonal isolation, the packers should be inflated or otherwise extended. Upon successful setting of the packers, two or more regions of the wellbore will be isolated form each other, with each region having fluid communication to different locations in the annular region.

In step 518, a pressure change in one or more annular zones is induced. The pressure change can be induced by pumping fluid into one or more regions of the wellbore that are in fluid communication with the annular region zones involved in the test. In step 520, changes in pressure are detected in one or more of the isolated regions, the detected changes being in response to the induced pressure change on one or more of the other annular zones. The fluid pumping or other means of pressure change can be supplied by the tool itself, for example by pumping fluid from one region to another region using a pump out module. The pressure can alternatively be altered from the surface, for example, by pumping fluid into or out of the entire wellbore, which is in fluid communication with one of the annular zones through perforations. In step 520, the changes in pressure may be detected, for example, by measuring pressure in one or more of the wellbore regions that is in direct fluid communication with the annular zones. Alternatively, the pressure change can be detected indirectly, such as by measuring other parameters such as fluid flow which reflects a pressure change.

In step 522, the measured data is recorded and/or transmitted to the surface for further analysis. Known techniques can be used to analyze the data to estimate therefrom various permeability parameters. For example, see, "Determining effective wellbore permeability from a field pressure test: a numerical analysis of detection limits" S. E. Gasda, J. M. Nordbotten, and M. A. Celia, Environ. Geol., DOI 10.1007/s00254-007-0903-7 (2007), incorporated herein by reference.

Figure 6:
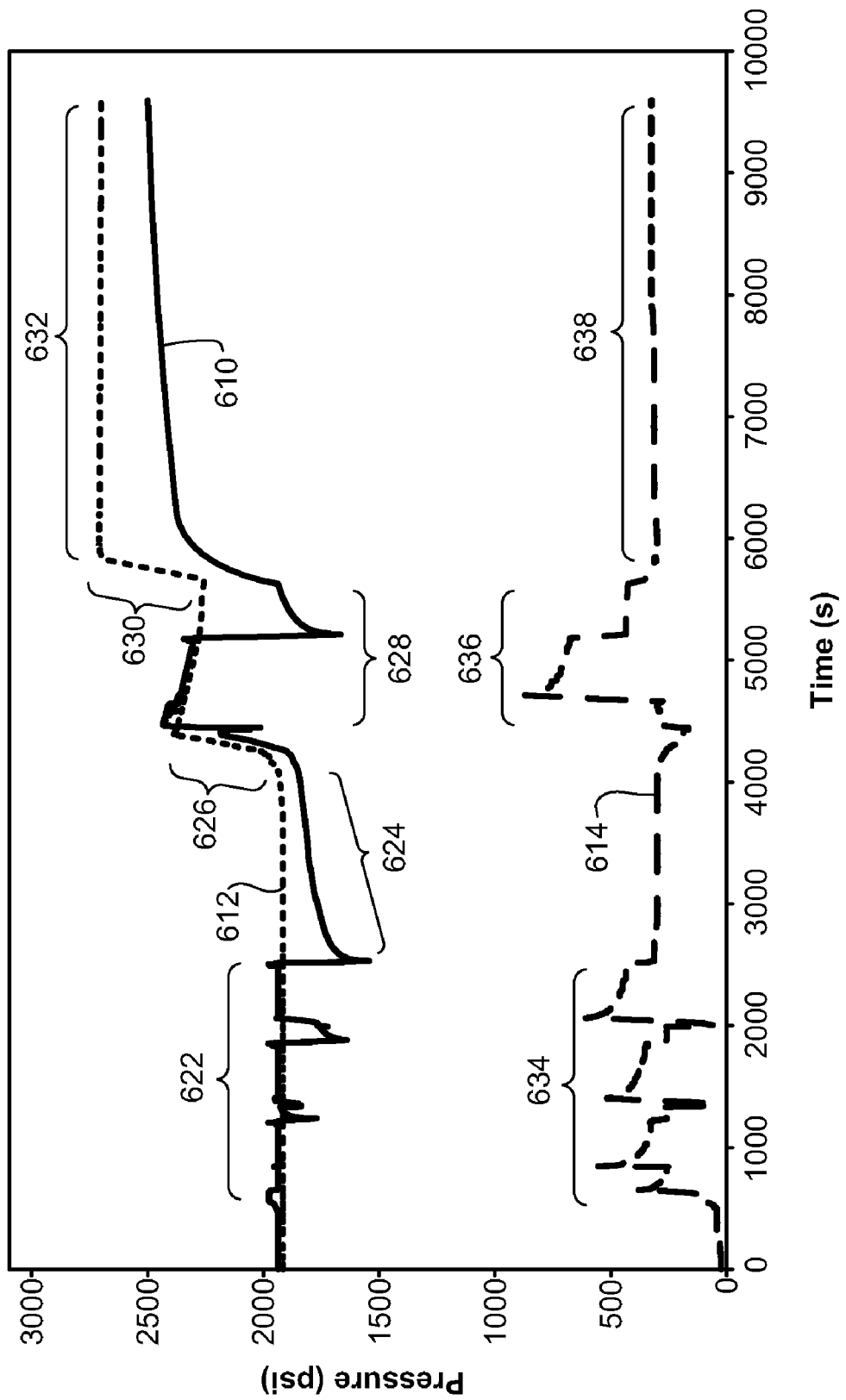
FIG. 6 is graph showing an example of pressure versus time data collected during an annular region test, according to embodiments.

FIG. 6 is graph showing an example of pressure versus time data collected during an annular region test, according to embodiments. The test was performed with a tool arrangement and positioning with respect to two sets of perforations similar to that shown in FIG. 2. In particular, the tool being used had a dual packer module straddling one set of perforations, and a single probe module in the vicinity of another set of perforations. Curve 612 shows the pressure measurements made by the single probe module, and curve 610 shows the pressure measurements made by the dual packer module. Curve 614 shows the packer inflation pressure of the dual packer module. In regions 634 and 622, the packers are initially inflated. In region 624, the well is being pressured up. In this example, the well pressure was increased by pumping fluid at the wellhead on the surface. In region 626 the packers were believed to be leaking. In regions 628 and 636, well pressuring was ceased and the packers were re-inflated. In region 630, the well was again pressured up. In region 632, the well pressuring was again ceased, the packer inflation pressure remained constant in region 638, and the data from curve 610 reflects the detected change in pressure over time of the packed off region.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Further, the invention has been described with reference to particular preferred embodiments, but variations within the spirit and scope of the invention will occur to those skilled in the art. It is noted that the foregoing examples have been provided merely for the purpose of explanation and are in no way to be construed as limiting of the present invention. While the present invention has been described with reference to exemplary embodiments, it is understood that the words, which have been used herein, are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A system for making measurements at multiple locations in an annular region of a cased sequestration well comprising:
    a first tool module positionable within the well and adapted to directly or indirectly measure changing pressure at a first location in the annular region of the well; the annular region being defined by an outer surface of the well casing and one or more subterranean formations within which the well is positioned;
    a pressure altering system arranged and positionable to induce a pressure change at the first location in the annular region; and
    a second tool module positionable within the well and adapted to directly or indirectly measure changing pressure at a second location in the annular region, wherein the pressure changes at the second location are at least partly in response to the induced pressure change at the first location.

2. A system according to claim 1 further comprising a third tool module positionable within the well and adapted to directly or indirectly measure changing pressure at a third location in the annular region, wherein the pressure changes at the third location are at least partly in response to the induced pressure change at the first location.

3. A system according to claim 1 wherein the first tool module measures pressure directly using a pressure sensor.

4. A system according to claim 1 wherein the second tool module measures pressure directly using a pressure sensor.

5. A system according to claim 1 wherein the second tool module measures pressure indirectly by measuring fluid flow.

6. A system according to claim 1 wherein the first and second locations are selected such that permeability of the one or more formations surrounding the annular region are believed to be substantially lower than permeability of the annular region between the first and second locations.

7. A system according to claim 1 wherein the first location is in fluid communication with a first interior region of the well via one or more openings in the casing adjacent the first location.

8. A system according to claim 7 wherein the one or more openings are perforations.

9. A system according to claim 8 wherein the perforations are opened by drilling.

10. A system according to claim 8 wherein the perforations are opened using a perforation gun tool.

11. A system according to claim 8 wherein the perforations are opened by milling.

12. A system according to claim 8 wherein the second location is in fluid communication with a second interior region of the well via one or more perforations in the casing adjacent the second location.

13. A system according to claim 12 wherein the first interior region and the second interior region are isolated within the well from one another.

14. A system according to claim 13 wherein the second tool module includes two extendable packers arranged and positioned to isolate the second interior region from the rest of the well thereby forming a second isolated interior region in communication with the second location in the annular region.

15. A system according to claim 14 wherein the first tool module includes two extendable packers arranged and positioned to isolate the first interior region from the rest of the well thereby forming a first isolated interior region in communication with the first location in the annular region.

16. A system according to claim 14 wherein the two extendable packers are inflatable packers and the second tool module includes one or more pressure sensors adapted and positioned to measure inflation pressure of the packers.

17. A system according to claim 1 wherein the pressure change at the first location is induced by flowing fluid into the first location.

18. A system according to claim 17 wherein the fluid is flowed by pumping fluid into the well at the surface.

19. A system according to claim 17 wherein the fluid is flowed by pumping fluid into the well with a pumping module positionable in the vicinity of the first location.

20. A method for making measurements at multiple locations in an annular region of a cased sequestration well comprising:
    measuring directly or indirectly pressure at a first location within the annular region of the well, the annular region being defined by an outer surface of the well casing and one or more subterranean formations within which well is positioned;
    inducing a pressure change at the first location in the annular region; and
    measuring directly or indirectly pressure at a second location in the annular region; wherein the pressure changes at the second location are at least partly in response to the induced pressure change at the first location.

21. A method according to claim 20 further comprising sealing one or more openings in the casing that are not adjacent either the first location or the second location.

22. A method according to claim 20 further comprising measuring directly or indirectly changing pressure at a third location in the annular region, wherein the pressure changes at the third location are at least partly in response to the induced pressure change at the first location.

23. A method according to claim 20 wherein pressures at the first and second locations are measured directly using pressure sensors.

24. A method according to claim 20 wherein pressure at the second location is measured indirectly by measuring fluid flow.

25. A method according to claim 20 wherein the first and second locations are selected such that permeability of the one or more formations surrounding the annular region are believed to be substantially lower than permeability of the annular region between the first and second locations.

26. A method according to claim 20 further comprising perforating the casing adjacent the first location with one or more perforations to create a first interior region in fluid communication with the first location.

27. A method according to claim 26 further comprising perforating the casing adjacent the second location with one or more perforations to create a second interior region in fluid communication with the second location.

28. A method according to claim 27 wherein the perforating is performed by drilling.

29. A method according to claim 27 wherein the perforating is performed by a perforation gun tool.

30. A method according to claim 27 wherein the perforating is performed by milling.

31. A method according to claim 27 further comprising sealing perforations in the casing following the measurements.

32. A method according to claim 27 further comprising isolating within the well the first interior region from the second interior region.

33. A method according to claim 32 wherein the isolating includes extending two packers arranged and positioned to isolate the second interior region from the rest of the well thereby forming a second isolated interior region in communication with the second location in the annular region.

34. A method according to claim 33 wherein the isolating further includes extending two packers arranged and positioned to isolate the first interior region from the rest of the well thereby forming a first isolated interior region in communication with the first location in the annular region.

35. A method according to claim 33 wherein the two packers are inflatable packers and the method further comprising measuring inflation pressure of one or both of the packers.

36. A method according to claim 20 wherein the inducing a pressure change at the first location includes flowing fluid into the first location.

37. A method according to claim 36 wherein the flowing includes pumping fluid into the well at the surface.

38. A method according to claim 36 wherein the flowing includes pumping fluid into the well in the vicinity of the first location.

* * * * *